United States Patent
Hampson et al.

(10) Patent No.: US 12,326,531 B2
(45) Date of Patent: Jun. 10, 2025

(54) DECONVOLUTION OF DOWN-GOING SEISMIC WAVEFIELDS

(71) Applicant: DUG Technology (Australia) Pty Ltd., West Perth (AU)

(72) Inventors: Gary Hampson, Peppermint Cove (AU); Gregory Szumski, Wraysbury (GB)

(73) Assignee: DUG Technology (Australia) Pty Ltd., West Perth (AU)

(*) Notice: Subject to any disclaimer, the term of this patent is extended or adjusted under 35 U.S.C. 154(b) by 383 days.

(21) Appl. No.: 17/838,089

(22) Filed: Jun. 10, 2022

(65) Prior Publication Data

US 2022/0299666 A1 Sep. 22, 2022

Related U.S. Application Data

(63) Continuation of application No. PCT/US2020/065908, filed on Dec. 18, 2020.

(60) Provisional application No. 62/951,478, filed on Dec. 20, 2019.

(51) Int. Cl.
  *G01V 1/30* (2006.01)
  *G01V 1/18* (2006.01)
  *G01V 1/38* (2006.01)

(52) U.S. Cl.
  CPC .............. *G01V 1/303* (2013.01); *G01V 1/181* (2013.01); *G01V 1/186* (2013.01); *G01V 1/3843* (2013.01); *G01V 2210/1293* (2013.01); *G01V 2210/1423* (2013.01); *G01V 2210/6222* (2013.01)

(58) Field of Classification Search
  CPC ........ G01V 1/303; G01V 1/181; G01V 1/186; G01V 1/3843
  See application file for complete search history.

(56) References Cited

U.S. PATENT DOCUMENTS

| 6,775,618 B1* | 8/2004 | Robertsson .......... G01V 1/3808 |
| | | 702/14 |
| 2005/0117451 A1* | 6/2005 | Robertsson ............ G01V 1/364 |
| | | 367/24 |
| 2012/0026830 A1 | 2/2012 | Wang et al. |
| 2013/0135965 A1 | 5/2013 | Ji et al. |
| 2014/0140171 A1* | 5/2014 | Sollner ................ G01V 1/3808 |
| | | 367/21 |

(Continued)

OTHER PUBLICATIONS

International Search Report and Written Opinion, International Application No. PCT/US2020/065908, dated Apr. 1, 2021.

(Continued)

*Primary Examiner* — Ricky Go
(74) *Attorney, Agent, or Firm* — Richard A. Fagin

(57) ABSTRACT

A method for reducing effects of free surface multiple reflections from seismic signal measurements. The measurements result from seismic energy imparted into the Earth's subsurface from collocated measurements related to pressure and vertical component of motion in response to the imparted seismic energy. The method includes entering as input to a computer the measurements related to pressure and vertical component of motion. In the computer, a down-going component of the measurements is determined. An impulse response of the Earth in the absence of a free surface from the down-going component is determined.

30 Claims, 7 Drawing Sheets

(56) References Cited

U.S. PATENT DOCUMENTS

2015/0234072 A1     8/2015   McConnell et al.

OTHER PUBLICATIONS

Examination Report under Section 18(3) dated Jul. 11, 2023, for United Kingdom Patent Application No. 2209186.2.
Examination Report for Australian Patent Application 2020405157 dated Apr. 26, 2023.

* cited by examiner

DECONVOLUTION OF DOWN-GOING SEISMIC WAVEFIELDS

CROSS REFERENCE TO RELATED APPLICATIONS

Continuation of International Application No. PCT/US2020/065908 filed on Dec. 18, 2020. Priority is claimed from U.S. Provisional Application No. 62/951,478 filed on Dec. 20, 2019. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of reflection seismic exploration. More specifically, the disclosure relates to methods for interpreting reflection seismic signals obtained in marine environments, wherein the water surface reflects up-going seismic energy. Such reflected energy subsequently forms part of the excitation energy into the sub-bottom (formations below the water bottom), resulting in a total "wavefield" of detected seismic energy having events from the sub-bottom induced both by energy directly propagating from a seismic energy source, and from energy reflected from the water surface.

Some types of reflection seismology record independent measurements of the total wavefield (all energy detected by seismic sensors or receivers in response to seismic energy imparted into the subsurface) that allow a linear decomposition into up-going and down-going wavefield components, denoted U and D, respectively. These wavefield components may be normalized to, for example, particle velocity, acceleration or pressure. With no loss of generality, in the description that follows the wavefield components may be pressure normalized.

At any given depth (e.g., below the water surface) of deployment of seismic sensors, denoted by z, the incident seismic wavefield from one or more seismic energy sources that excites the Earth's subsurface is composed of all down-going waves. However, seismic energy reflected from acoustic impedance changes in the subsurface may be itself re-reflected, in particular, for example, from a near or at-surface reflector such as the surface of the water (free surface) in marine seismic surveying. As a result the effective excitation ("effective" source) of the subsurface or sub-bottom is a combination of not only the energy emitted by the seismic energy source(s), but also all reflections from the free-surface. One may write an expression describing the up-going wavefield in the frequency-wavenumber domain as the product of the Earth's response to a down-going wavefield as:

$$U = DP_0 \tag{a}$$

wherein $P_0$ is the Earth's impulse response in the absence of a free-surface, where the signals are measured at the sensor depth z.

Sonneland & Berg (1987), followed later by substantial theoretical elaboration by Amundsen (2001), used the foregoing principle to demonstrate, in a marine environment, that Eq. (a) can be inverted to perform free-surface multiple (water layer) reflection attenuation and signature deconvolution, thereby providing the deconvolved wavefield as represented in Eq. (b):

$$P_0 = \frac{U}{D} \tag{b}$$

Such so-called "up/down deconvolution" is widely used to process seismic surveys using ocean bottom node (OBN) detected seismic signals, wherein independent sensor nodes are placed on the water bottom, and using ocean bottom cable (OBC) detected seismic signals, where cables having seismic sensors at spaced apart locations are placed on the water bottom. Such up/down deconvolution is useful because it effectively obtains the combination of true three-dimensional (3D) source signature deconvolution and free-surface multiple attenuation. Furthermore, it usually performs the foregoing better than more conventional modular processes that have been adapted for use with OBN/OBC acquired seismic data.

A possible limitation of using the up-going wavefield is that specular reflections at, and just below, the sensor or receiver (the terms "sensor" and "receiver" used interchangeably throughout this disclosure) deployment depth z are limited in their extent to an area immediately around each receiver. Since the receivers are typically widely spaced apart, this may result in a substantially incomplete image of the shallow sub-bottom in OBC/OBN seismic surveys. A second aspect of this is that the angles of reflection are large leading to sometimes unacceptable levels of wavelet stretch during seismic imaging.

In contrast, the down-going wavefield, which exploits mirror imaging, does not suffer from such limitations. Mirror imaging uses "virtual" receivers instead of the physically embodied receivers. The virtual receivers are "located" as far above the free-surface (e.g., the water surface) as the actual receivers are located below the free-surface. Consequently the angles of reflection are smaller and specular reflections may be effectively detected over a wider area around each receiver. As a result, the down-going wavefield is often preferred in seismic interpretation because it produces better shallow images that have more complete specular reflection coverage. However, the down-going wavefield may suffer from the limitation that there is no similarly powerful deconvolution technique as there is for the up-going wavefield; using the down-going wavefield relies on some combination of conventional methods used for OBN/OBC surveys.

SUMMARY

One aspect of the present disclosure relates to a method for reducing effects of free surface multiple reflections from seismic signal measurements resulting from seismic energy imparted into the Earth's subsurface from collocated measurements of pressure and vertical component of motion in response to the imparted seismic energy. The method includes entering as input to a computer the measurements of pressure and vertical component of motion. In the computer, a down-going component of the measurements is determined. An impulse response of the Earth in the absence of a free surface from the down-going component is determined.

A method for seismic surveying according to another aspect of this disclosure includes actuating a seismic energy source to impart seismic energy into subsurface formations. Collocated measurements of pressure and vertical component of motion are made in response to the imparted seismic energy. The measurements are entered as input to a computer. In the computer, a down-going component of the measurements is determined. An impulse response of the Earth in the absence of a free surface from the down-going component is determined. The determined impulse response is stored and/or displayed.

In some embodiments, the measurements of pressure comprise measurements of a time derivative of the pressure.

In some embodiments, the measurements of a time derivative comprise hydrophone measurements.

In some embodiments, the measurements of vertical component of motion comprise particle velocity measurements.

In some embodiments, the particle velocity measurements comprise geophone measurements.

Some embodiments further comprise, in the computer, transforming the collocated measurements of pressure and vertical component of motion in response to the imparted seismic energy to the frequency-wavenumber domain, and transforming the determine impulse response to the time-space domain.

Some embodiments further comprise filtering the determined impulse response of the Earth by a filter representing a band-limited monopole seismic energy source.

In some embodiments, the seismic energy is imparted by a source proximate the surface of a body of water.

In some embodiments, the measurements of pressure and vertical component of motion in response to the imparted seismic energy are made by sensors disposed proximate the bottom of a body of water.

In some embodiments, the down-going component of the measurements is determined by linear decomposition.

A computer program stored in a non-transitory computer readable medium according to another aspect of the disclosure has logic operable to cause a programmable computer to perform acts including accepting as input to the computer collocated measurements of pressure and vertical component of motion resulting from seismic energy imparted into the Earth's subsurface; determining a down-going component of the measurements; determining an impulse response of the Earth in the absence of a free surface from the down-going component; and at least one of storing and displaying the determined impulse response.

In some embodiments, the measurements of pressure comprise measurements of a time derivative of the pressure.

In some embodiments, the measurements of a time derivative comprise hydrophone measurements.

In some embodiments, the measurements of vertical component of motion comprise particle velocity measurements.

In some embodiments, the particle velocity measurements comprise geophone measurements.

Some embodiments of the program further comprise logic operable to cause the computer to perform transforming the collocated measurements of pressure and vertical component of motion in response to the imparted seismic energy to the frequency-wavenumber domain, and transforming the determined impulse response to the time-space domain.

Some embodiments of the program further comprise logic operable to cause the computer to perform filtering the determined impulse response of the Earth by a filter representing a band-limited monopole seismic energy source.

In some embodiments, the seismic energy is imparted by a source proximate the surface of a body of water.

In some embodiments, the measurements of pressure and vertical component of motion in response to the imparted seismic energy are made by sensors disposed proximate the bottom of a body of water.

In some embodiments, the down-going component of the measurements is determined by linear decomposition.

Other aspects and possible advantages will be apparent from the description and claims that follow.

DETAILED DESCRIPTION

Acquisition of seismic signals usable with methods according to the present disclosure is described herein generally with reference to acquisition of signals using ocean bottom cables (OBCs). It is to be clearly understood that methods according to this disclosure are equally applicable to seismic signals acquired using ocean bottom nodes (OBNs), and reference in the following description to OBC sensors or receivers is equally applicable to signals acquired with OBN sensors or receivers.

Figure 1:
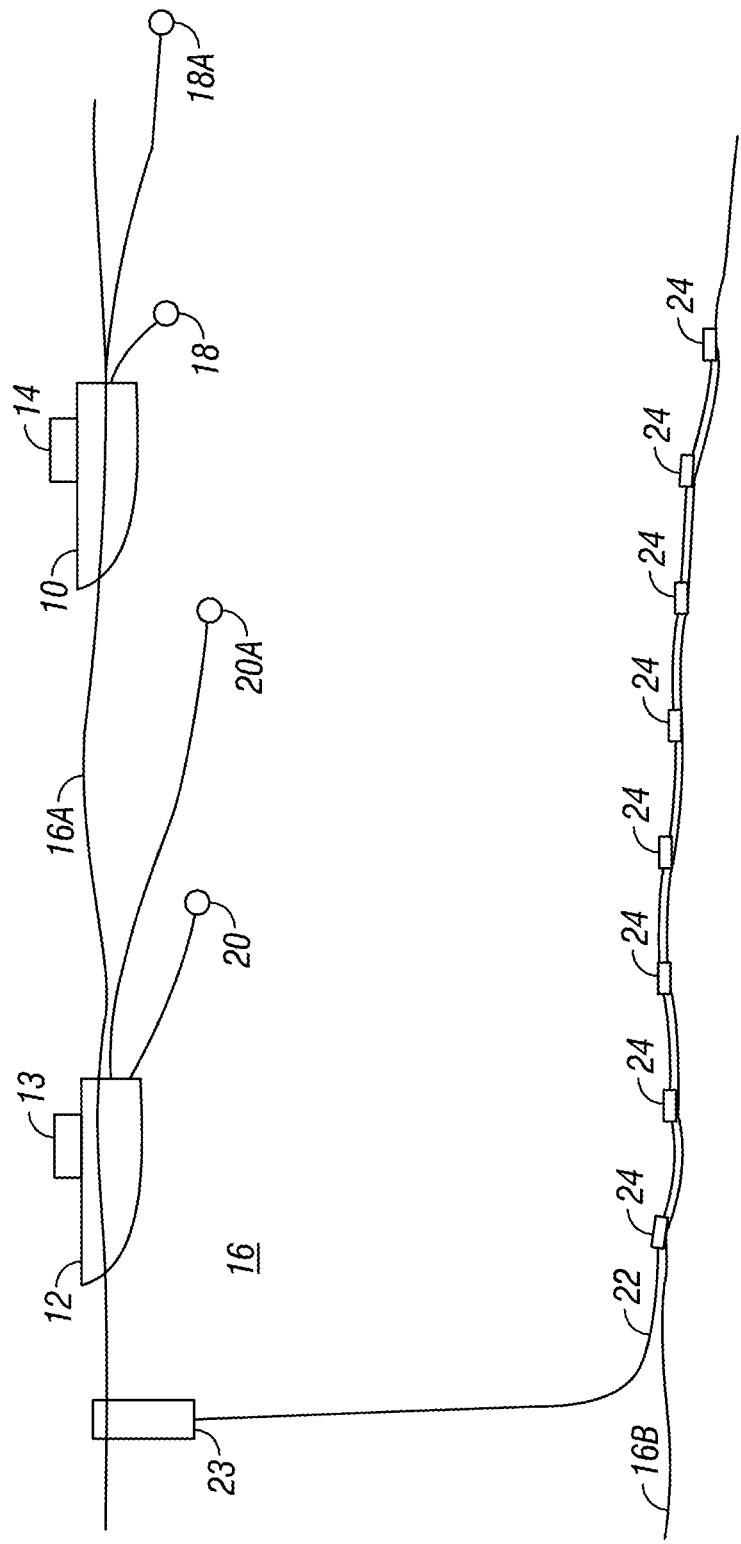
FIG. 1 shows an example of acquiring seismic signals usable with methods according to the present disclosure.

FIG. 1 shows a vertical section view of an OBC seismic survey being conducted using, for example, two different "source" vessels for towing seismic energy sources. In some embodiments, only one source vessel may be used. According to the present disclosure, any number of source vessels may be used and the following description is not intended to limit the scope of the present disclosure. The source vessels move along the surface 16A of a body of water 16 such as a lake or the ocean. In the present example, a vessel referred to as a "primary source vessel" 10 may include equipment, shown generally at 14, that comprises components or subsystems (none of which is shown separately) for navigation of the primary source vessel 10, for actuation of seismic energy sources and for retrieving and processing seismic signal recordings. The primary source vessel 10 is shown towing two, spaced apart seismic energy sources 18, 18A.

The equipment 14 on the primary source vessel 10 may be in signal communication with corresponding equipment 13 (including similar components to the equipment on the primary source vessel 10) disposed on a vessel referred to as a "secondary source vessel" 12. The secondary source vessel 12 in the present example also tows spaced apart seismic energy sources 20, 20A near the water surface 16A. In the present example, the equipment 14 on the primary source vessel 10 may, for example, send a control signal to the corresponding equipment 13 on the secondary source vessel 12, such as by radio telemetry, to indicate the time of actuation (firing) of each of the sources 18, 18A towed by the primary source vessel 10. The corresponding equipment 13 may, in response to such signal, actuate the seismic energy sources 20, 20A towed by the secondary source vessel 12.

The seismic energy sources 18, 18A, 20, 20A may be air guns, water guns, marine vibrators, or arrays of such devices. The seismic energy sources are shown as discrete devices in FIG. 1 to illustrate the general principle of seismic signal acquisition. The type of and number of seismic energy sources that can be used in any example is not intended to limit the scope of the disclosure.

In FIG. 1, an OBC 22 is deployed on the bottom 16B of the water 16 such that spaced apart seismic receiver modules 24 are disposed on the water bottom 16B in a preselected pattern. The receiver modules 24 may include a pressure or pressure time gradient responsive seismic sensor, and one or more seismic particle motion sensors, for example, one-component or three-component geophones, or one- or three-component accelerometers (none of the sensors are shown separately). The type of and the number of seismic sensors in each module 24 is not intended to limit the scope of the disclosure. The seismic sensors in each module 24 generate electrical and/or optical signals (depending on the sensor type) in response to, in particular, detected seismic energy resulting from actuations of the seismic energy sources 18, 18A, 20, 20A. In some embodiments, the sensors may comprise pressure or pressure time derivative sensors such as hydrophones, and one or more particle motion responsive sensors such as geophones or accelerometers. In some embodiments, such particle motion responsive sensors may be oriented so as to be sensitive principally (ignoring any cross-component coupling for purposes of explanation) to vertical particle motion. The signals generated by the various sensors may be conducted to a device near the water surface 16A such as a recording buoy 23, which may include a data recorder (not shown separately) for storing the signals for later retrieval and processing by the equipment 14 on the primary source vessel 10, or other processing equipment to be described further below. The data storage functions performed by the recording buoy 23 may be performed by different types of equipment, such as a data storage unit on a recording vessel (not shown) or a recording module (not shown) deployed on the water bottom 16B, e.g., proximate each sensor module 24, or even on the primary or secondary source vessels. Accordingly, the disclosure is not limited in scope to use with a recording buoy or any other specific recording device(s).

Although the description of acquiring signals explained with reference to FIG. 1 is for sensors deployed on the water bottom, it will be appreciated that it is possible to obtain corresponding measurements at any selected depth in the water, using, for example, seismic sensors disposed in a towed cable such as described in U.S. Pat. No. 7,239,577 issued to Tenghamn, et al.

An explanation of methods according to this disclosure may begin by describing the scattered wavefield components due to a seismic source being used with OBN or OBC receivers as in FIG. 1, (although the receivers could be placed at any other depth in the water layer). After a review of how up/down deconvolution works, a new idea is introduced in which a similarly powerful deconvolution technique may be used on the down-going wavefield. The method may be referred to as down-down deconvolution. The description will conclude with a discussion of source estimation methods that may be used with down/down deconvolution.

1. The Wavefield Components

One may define the ghosted (surface reflected) source wavefield to be a pair of monopoles with a temporal spectrum represented by $b(\omega)$:

$$S = -\frac{b(\omega)}{ik_z}\left(e^{-ik_z z_s} + Re^{+ik_z z_s}\right) \quad (1)$$

The pair of monopoles represents the ghost effect due to the source depth $z_s$ and the (water surface) free-surface reflectivity function, $R$. The vertical wavenumber is given by $k_z$ which obeys the dispersion relation of the scalar wave equation and Claerbout's (1985) Fourier sign convention is used herein.

The receiver (e.g., as explained with reference to FIG. 1) depth is denoted by $z_r$ and, for convenience, the receivers are assumed to be deployed on the water bottom as explained with reference to FIG. 1, such that the receiver depth is the same as the water layer depth at each received location. The water layer covers a reflective elastic or acoustic half-space (e.g., all the materials below the water bottom 16B in FIG. 1). In the absence of a free-surface (water surface 16A in FIG. 1), $P_0$ denotes the impulse response of the reflective acoustic half-space measured just above the water bottom (16B in FIG. 1). A down-going plane wave downwardly propagated from the water surface to the water bottom undergoes a phase change of $\exp(+ik_z z_r)$. For convenience one can define:

$$Z = e^{+ik_z 2 z_r} \quad (2)$$

Figure 2:
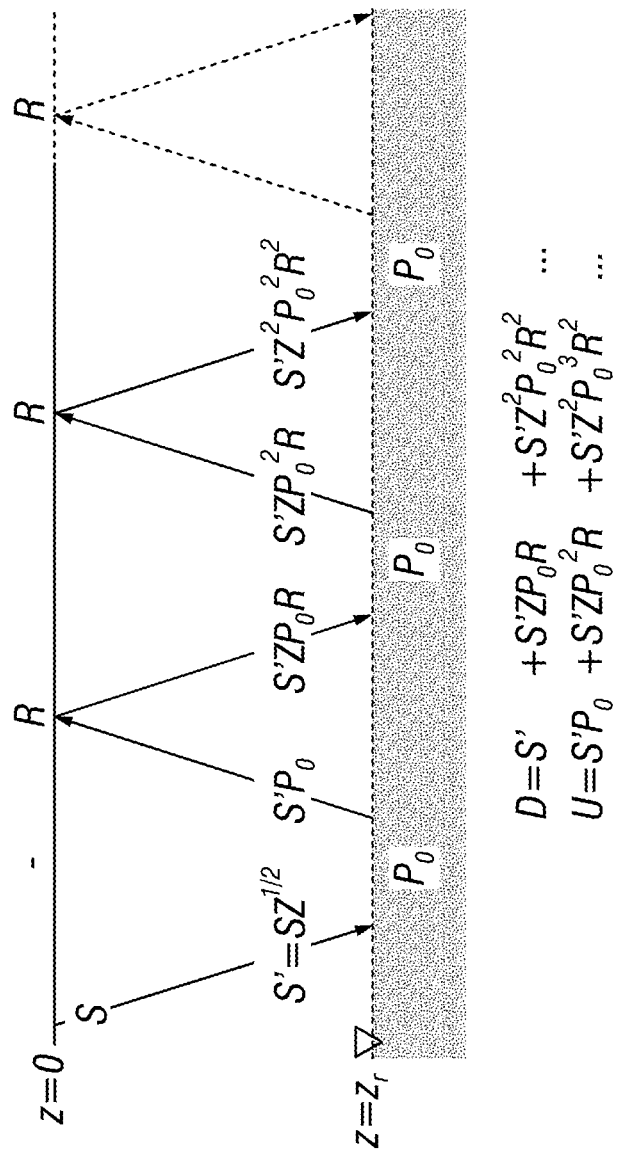
FIG. 2 shows up- and down-going wavefield components at water depth $z=z_r$.

Referring to FIG. 2, it is possible to construct the wavefield components one step at a time and conclude that the up-going U and down-going D wavefields may be represented by the respective infinite series:

$$D = S' + S'ZP_0R + S'Z^2P_0^2R^2$$

$$U = S'P_0 + S'ZP_0^2R + S'Z^2P_0^3R^2 \quad (3)$$

in which are used the identity $S' = SZ^{+1/2}$. Each term in the series of Eq. (3) is the product of the previous term multiplied by $ZP_0R$, i.e., a delay equivalent to the travel-time through the water layer, reflection from the free-surface and reflection from the materials in the underlying Earth, namely, those materials below the water bottom.

The series in Eq. (3) are Taylor series expansions of the expressions:

$$D = \frac{S'}{1 - ZP_0R} \quad (4)$$

$$U = \frac{S'}{1 - ZP_0R}P_0$$

The denominator in both expressions of Eq. (6) is sometimes termed the "scattering operator" because it describes all scattering between the free-surface and the Earth's reflectivity. Eq. (4) represents take-off points for a wide range of multiple prediction techniques including Backus filtering and surface related multiple elimination (SRME) known in the art.

2. Up/Down Deconvolution

The ratio of the expressions in Eq. (4), namely:

$$\frac{U}{D} = \frac{S'}{1-ZP_0R}P_0 \bigg/ \frac{S'}{1-ZP_0R} = P_0 \qquad (5)$$

is known in the art as up/down deconvolution. Such deconvolution performs 3D signature deconvolution and free-surface multiple attenuation in a single step. $P_0$ is the dipole impulse response just above the water bottom in the absence of a free-surface. It is common to replace the dipole source just above the water bottom with a band-limited monopole at the water surface. Therefore, the full up/down deconvolution is usually considered to be:

$$-\frac{a(\omega)}{ik_z}\frac{U}{D}Z^{+1/2} = -\frac{a(\omega)}{ik_z}P_0Z^{+1/2} \qquad (6)$$

in which $\alpha(\omega)$ is a desired temporal spectrum and the term $-1/ik_z$ converts the dipole source to a monopole source.

3. Down/Down Deconvolution

Taking the inverse of the first expression in Eq. (4) and multiplying by S' it may be observed that:

$$1 - ZP_0R = \frac{S'}{D} \qquad (7)$$

Eq. (7 indicates that it is possible to deconvolve the down-going wavefield from the source wavefield at $z=z_r$ and find that it has substantially isolated the desired impulse response, $P_0$. This may be termed 'down/down deconvolution'. However, further re-arrangement may complete the solution for $P_0$ as:

$$P_0 = \frac{1}{ZR}\left(1 - \frac{S'}{D}\right) \qquad (8)$$

Therefore, in an embodiment of a method according to this disclosure, first perform the deconvolution of Eq. (7), then remove the additive effect of δ(x,y,t) and finally remove the datum correction implied by $Z^{-1}$. The free-surface reflectivity function R, may be treated as a scalar or as a more elaborate operator. As observed for the up/down deconvolution case, because $P_0$ is the plane wave impulse response at the receiver depth $z=z_r$ further adjustment to convert the impulse response to a monopole band-limited response at the free-surface may use the following expression:

$$-\frac{a(\omega)}{ik_z}P_0Z^{+1/2} = -\frac{a(\omega)}{ik_z}\frac{1}{ZR}\left(1-\frac{S'}{D}\right)Z^{+1/2} = \frac{a(\omega)}{ik_z}\frac{1}{R}\left(\frac{S'}{D}-1\right)Z^{-1/2} \qquad (9)$$

which formulates the complete deconvolution. However, under some circumstances, some terms may be optionally omitted in much the same manner as in up/down deconvolution. Experience in evaluating a method according to this disclosure shows that subject to judicious regularization, Eqs. (7), (8) and (9) are easily and reliably computed. The required components to perform the complete deconvolution, Eq. (9), are described in more detail below.

4. Down/Down Deconvolution Requirements $\alpha(\omega)$—is the desired temporal spectrum of the monopole source, and it can be chosen to determine the bandwidth of the output of deconvolution and to help regularize the deconvolution process.

$-1/ik_z$—is an operator that converts the dipole source to a monopole source (Aki and Richards, 1980).

R—is the reflectivity of the free-surface, and is often taken to be a scaler close to −1. However it is easy to use other reflectivities, such as frequency dependent reflectivity (Orji et al., 2013). Since R has, at worst, mild band limitation, it is easily and robustly deconvolved.

$Z=e^{+ik_z 2z_r}$—is an operator that extrapolates the wavefield through the water layer twice. Knowledge of Z depends upon knowing the propagation velocity and the water depth. For the OBN or OBC case, these parameters are usually accurately known.

$S'=SZ^{+1/2}$—is a term which there are several ways to determine. In the case of sufficiently deep water, S' can be derived by isolating s'(t,x,y) as the early part of d (t,x,y) using windowing: $D=S'+S'ZP_0R+S'Z^2P_0^2 R^2$.

S' may also be derived from a linear combination of U and D using the expression S'=D−RZU. It may be shown that this is closely related to the cross-ghosting method described in Soubaras (1996).

S can be derived from near field pressure or pressure time derivative (hydrophone) signal recordings using the notional source technique of Ziolkowski et al. (1982) coupled with $Z^{+1/2}$ from knowledge of Z (see above). S can also be calculated using source modeling software coupled with $Z^{+1/2}$ from knowledge of Z (see above).

D is the down-going wavefield, which may be derived as a linear combination, $D=(P+\rho\omega V_z/k_z)/2$ of the pressure and the vertical component of the particle motion (velocity) fields. This relies upon good quality pressure and particle velocity field measurements with minimal noise.

5. An Example

Figure 3:
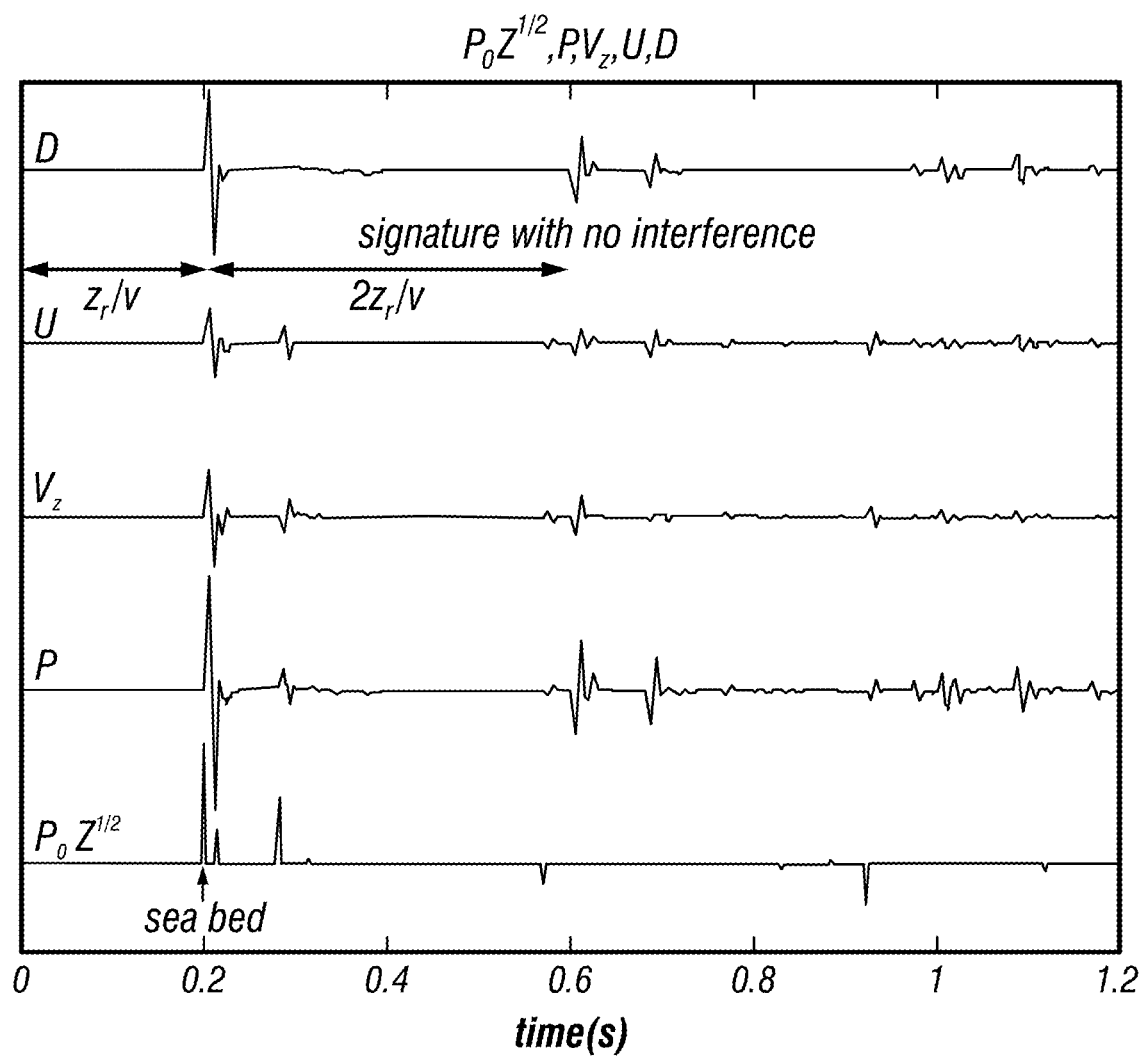
FIG. 3 shows a 1-dimensional model of sparse reflectors beneath 300 m of sea-water.

The following example uses a synthetic set of simulated reflections beneath a 300 m water layer. The source is a simulation of an actual air gun's (or array) acoustic or seismic signature. The reflectivity consists of a sparse number of isolated reflectors which are shown in the lower trace of FIG. 3, that has been delayed by $z_r/v$, where v denotes water velocity. In the current notation this is $P_0Z^{+1/2}$. The upper two traces in FIG. 3 show the up-going and down-going seismic receiver traces (signal representations) that would result from using the air gun source and the sensor placed just above the water bottom.

For illustration, the total pressure and vertical particle velocity (P & $V_z$) are also shown as the $2^{nd}$ and $3^{rd}$ traces from the bottom. Normally U and D are derived from the recorded P and $V_z$. It is worth noting that the only down-going information prior to $t=3z_r/v$ is the seismic source signature.

Figure 4:
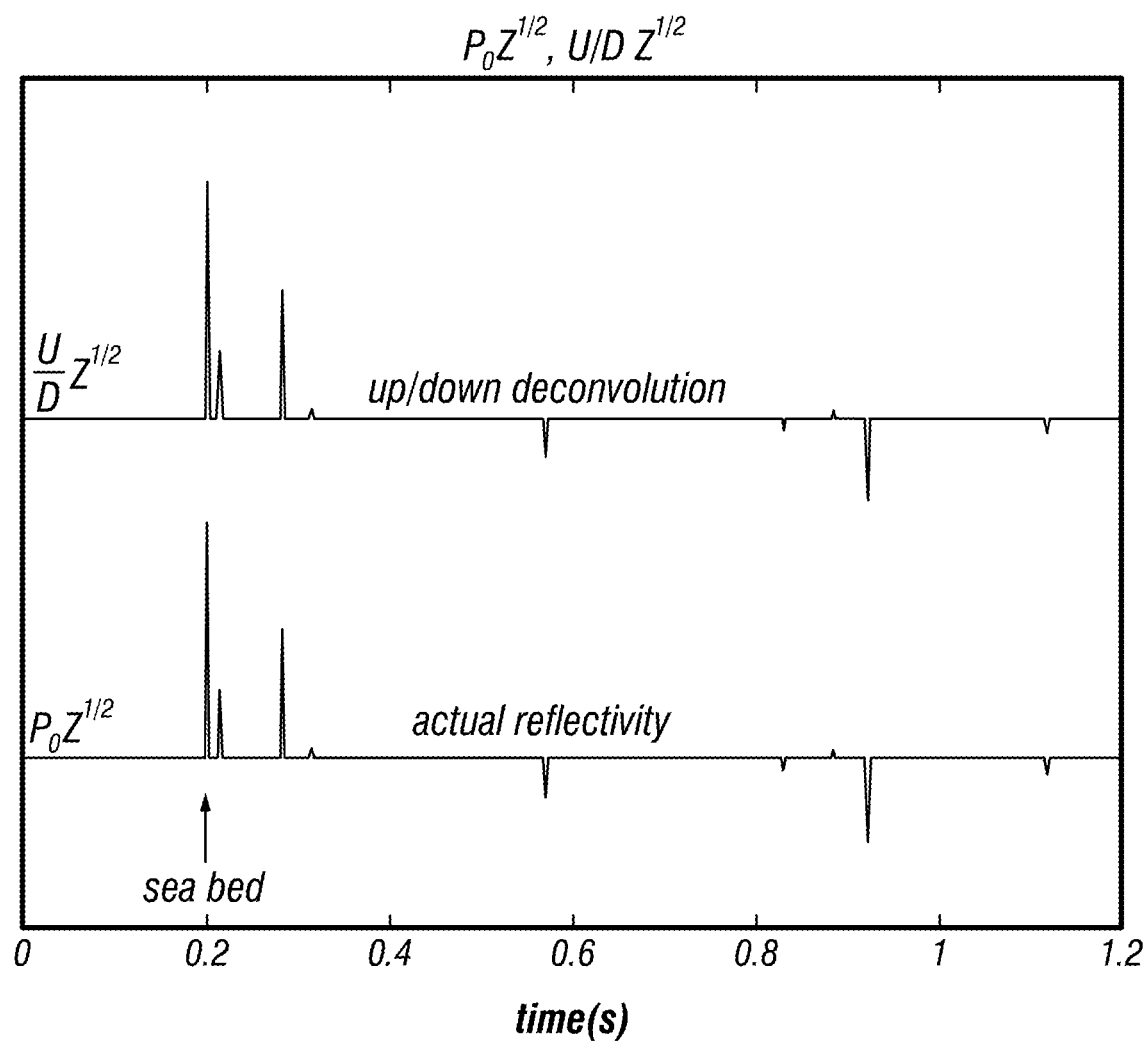
FIG. 4 shows the result of applying up/down deconvolution to the data in FIG. 2 compared to the actual reflectivity.

Up/down deconvolution considers D as the effective seismic source. Deconvolving it from U, as in Eq. (5) and applying the shift in Eq. (6) produces the deconvolved result, $U/DZ^{+1/2}$, which is shown compared to the actual reflectivity, $P_0Z^{+1/2}$ shown in FIG. 4.

Figure 5:
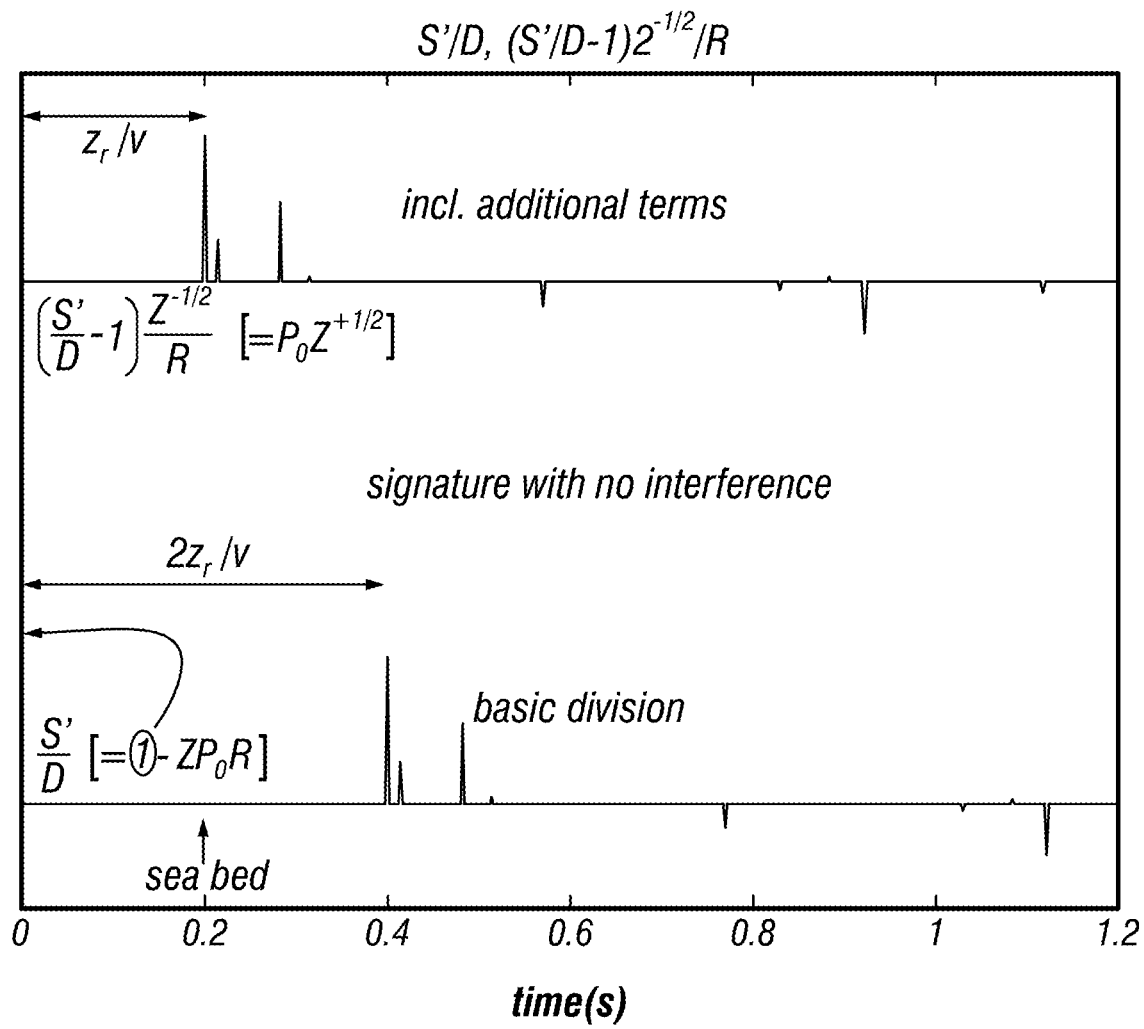
FIG. 5 shows the result of applying down/down deconvolution according to the present disclosure to the down-going data shown in FIG. 2. The lower trace is the result of applying Eq. (7). The upper trace has applied the additional terms in Eq. (8) and the delay term in Eq. (9). This may be compared with the actual reflectivity in FIG. 3 or FIG. 4.

Using the down-going trace from FIG. 2, and the known source term, S', the initial division in Eq. (7) was performed. The result is shown as the lower trace in FIG. 5. It substantially obtains the deconvolution but requires the additional terms of Eq. (8) and the shift from Eq. (9) to complete the deconvolution. The result is shown as the upper trace in FIG. 5, which may be compared to the actual reflectivity, $P_0 Z^{+1/2}$ in FIG. 3, or FIG. 4. This example illustrates the principle and demonstrates that this new method may be expected to perform as explained.

An example embodiment of a method according to the present disclosure will now be explained with reference to FIG. 6.

Seismic signals acquired as explained with reference to FIG. 1 may be recorded. The recorded signals, comprising time series of pressure and vertical particle motion with reference to the location of the source(s) and sensors from which the signals are recorded, can be decomposed into up-going and down-going wavefield components, denoted U and D, respectively. Typically the recorded data consists of collocated pressure and vertical particle velocity recordings (P and Vz respectively).

For convenience, the fields D, U, P and Vz are shown in the frequency-wavenumber domain unless otherwise specified. The well-known decomposition from P,Vz to D,U is performed by subtracting and adding pressure normalized versions of Vz to P as follows, $$D = \frac{1}{2}\left(P - \frac{\rho v}{\cos\theta} V_z\right) \quad (12)$$

$$U = \frac{1}{2}\left(P + \frac{\rho v}{\cos\theta} V_z\right)$$

In which $\rho$, $v$ and $\theta$ are, respectively, the bulk density of the medium, propagation velocity of the medium and the ray angle of the propagating wave.

A solution may be calculated for a band limited monopole source situated at the water surface in the absence of free-surface reflectivity, that is, what is expressed on the right hand side of the following expression:

$$-\frac{a(\omega)}{ik_z} P_0 Z^{+1/2} = \frac{a(\omega)}{ik_z}\left[\frac{1}{R}\left(\frac{S'}{D} - 1\right) Z^{-1/2}\right], \quad (13)$$

The novel concept is contained in the square brackets in Eq. (13). The required components for the solution are:

D is the down-going wavefield.

Z is the wave extrapolator to extrapolate a down-going wavefield downwards to a depth equal to twice the water layer thickness.

$S' = SZ^{+1/2}$ is the surface source wavefield that would be observed at a depth equal to the water layer thickness.

Figure 6:
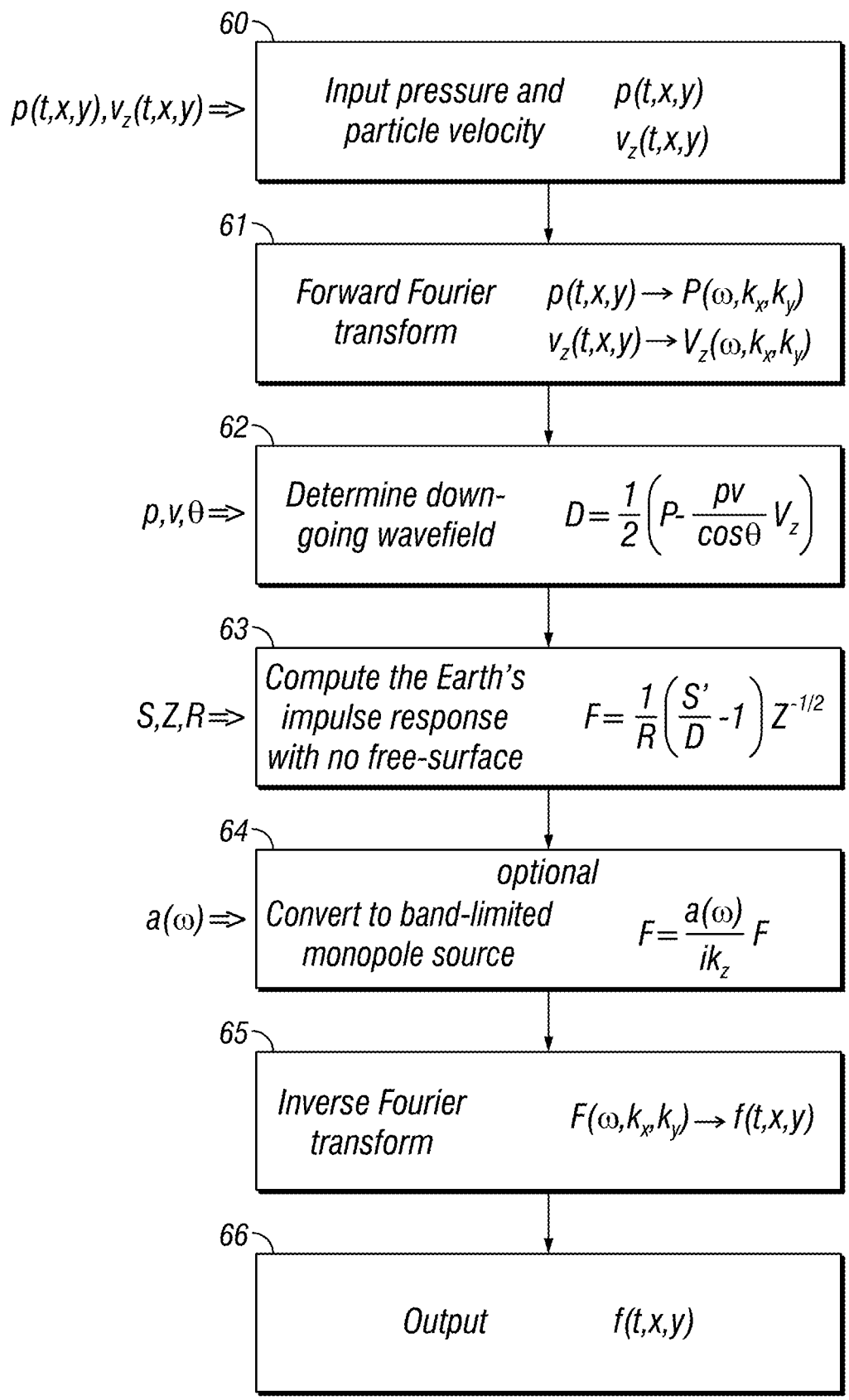
FIG. 6 is a flow chart of an example embodiment of a method according to the present disclosure.
Figure 7:
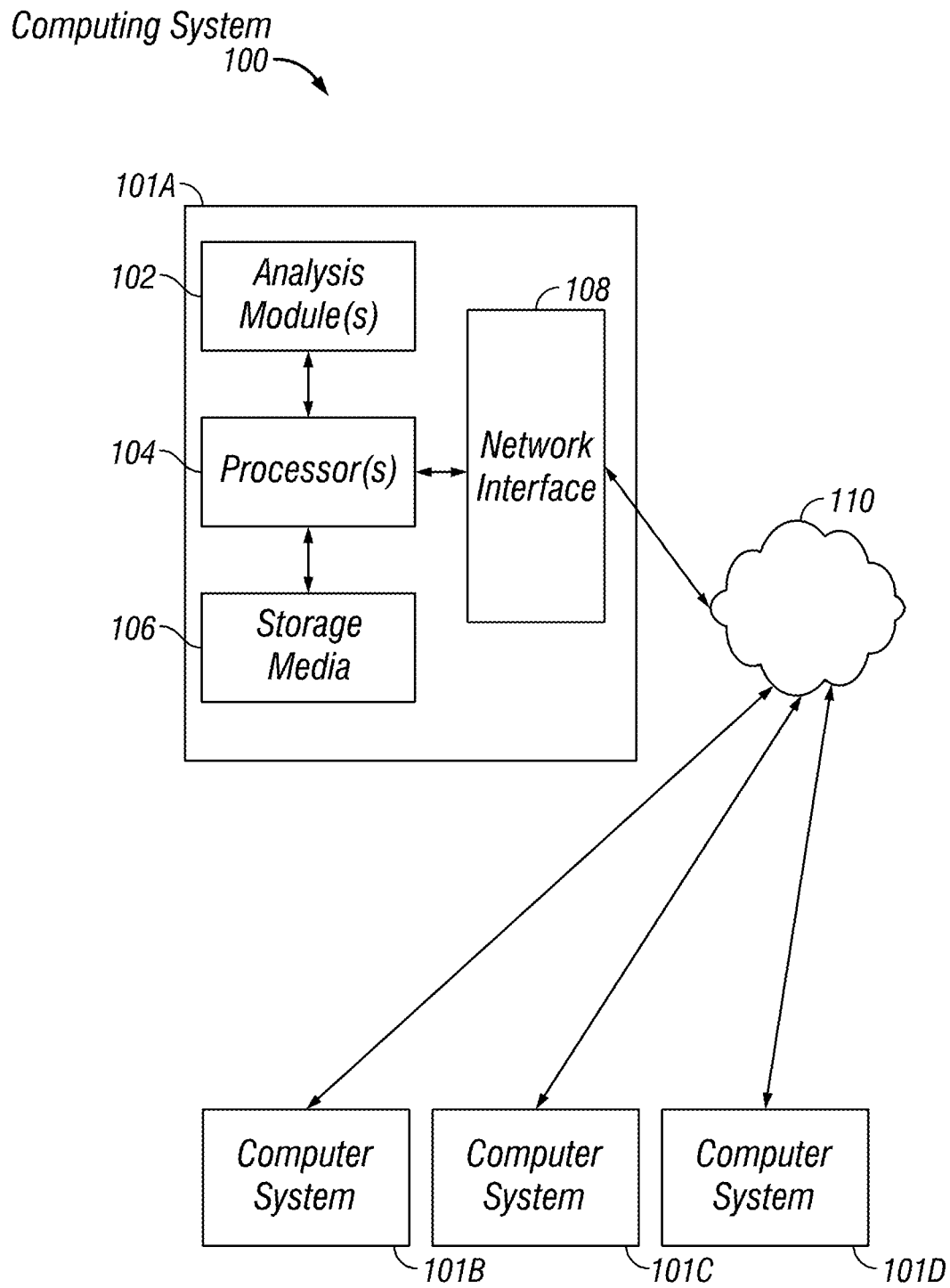
FIG. 7 shows an example processing system that may be used to implement methods according to this disclosure.

R is the reflectivity of the free-surface $\alpha(\omega)$ is the spectrum of a desired band-limited monopole source i is the square root of $-1$ $k_z$ is the vertical spatial frequency consistent with the dispersion relation of the scalar wave equation at temporal frequency $\omega$:

At 60 in FIG. 6, the pressure and particle velocity, $p(t,x,y), v_z(t,x,y)$ are input to a computer or processor (FIG. 7).

At 61, in the computer, the input signals may be Fourier transformed, $p(t,x,y), v_z(t,x,y) \rightarrow P(\omega,k_x,k_y) V_z(\omega, k_x, k_y)$, into the frequency-wavenumber (f–k) domain.

At 62, in the computer, derive the down-going wavefield, D from the (Fourier transformed) input data, P and $V_z$.

At 63, in the computer, calculate the Earth's impulse response. At each temporal/spatial frequency evaluate the square bracket part of Eq. (13) using the following:
a. form the ratio S'/D
b. subtract unity from the results of [0078] a)
c. divide the result of [0078] b) by the free-surface reflectivity, R
d. depth extrapolate to push the apparent seismic source depth down by an amount equal to the water layer thickness→F At 64, which is optional, at each frequency/wavenumber apply the terms outside the square brackets in Eq. (13):
a. apply the band-limiting filter $\alpha(\omega)$ to the results of 63, element [0078] d above
b. divide the result by i times the vertical wavenumber, $k_z$→F At 65, in the computer, inverse transform from the frequency/wavenumber domain to the time/space domain, $F(\omega, k_x,k_y) \rightarrow f(t,x,y)$ At 66, output the results f t, x, y) for recording and/or display, and possible use as input to other seismic data processes.

All of the above calculations may be performed in any general purpose or purpose specific computer or processor. FIG. 7 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 2-6. To perform these various tasks, the analysis module 102 may operate independently or in coordination with one or more processors 104, which may be connected to one or more storage media 106. A display device such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 7 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 7, and/or the computing system 100 may have a different configuration or arrangement of the components shown in FIG. 7. The various components shown in FIG. 7 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, GPUs, coprocessors or other appropriate devices. These modules, combinations of these modules, and/or their combination with general hardware are all included within the scope of the present disclosure.

Described herein is a new method in which the down-going wavefield recorded just above the water-bottom can be deconvolved to reveal the response of the Earth to a monopole source in the absence of a free-surface. This method removes free-surface multiples and performs 3D signature deconvolution. It requires a good estimate of the seismic source signature, which may be derived from the OBN or OBC measurements (among other approaches), and a good estimate of the down-going wavefield.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

References cited in this disclosure include:

Aki, K., and Richards, P. G., 1980, Quantitative seismology theory and methods, Volume 1, W.H. Freeman and Company, New York.

Amundsen, L., 2001, Elimination of free-surface related multiples without need of the source wavelet, Geophysics, 66, 1.

Claerbout, J. F., 1985, Imaging the Earth's interior, Blackwell, Oxford.

Orji, O. C., Sollner, W. C., and Gelius, L. J., 2013, Sea Surface Reflection Coefficient Estimation, SEG Technical Program Expanded Abstracts: 51-55.

Sonneland, L., and Berg, L. E., 1987, Comparison of two approaches to water layer multiple attenuation by wave field extrapolation, SEG Technical Program Expanded Abstracts: 276-277.

Soubaras, R., 1986, Ocean bottom hydrophone and geophone processing, SEG Technical Program Expanded Abstracts 1996, 24-27

Ziolkowski, A., Parkes, G., Hatton, L. and Haugland, T., 1982, The signature of an air gun array: Computation from near-field measurements including interactions, Geophysics, 47(10).

What is claimed is:

1. A method for reducing effects of free surface multiple reflections in seismic signal measurements, the measurements resulting from seismic energy imparted into the Earth's subsurface from collocated measurements of pressure and vertical component of motion in response to the imparted seismic energy, the method comprising:
    entering as input to a computer the measurements related to pressure and vertical component of motion;
    in the computer, determining a down-going component of the measurements without using an up-going component of the measurements;
    in the computer, determining an impulse response of the Earth to the imparted seismic energy in the absence of a free surface from the down-going component; and
    at least one of storing and displaying the determined impulse response.

2. The method of claim 1 wherein the measurements related to pressure comprise measurements of a time derivative of the pressure.

3. The method of claim 2 wherein the measurements of a time derivative of pressure comprise hydrophone measurements.

4. The method of claim 1 wherein the measurements related to vertical component of motion comprise particle velocity measurements.

5. The method of claim 4 wherein the particle velocity measurements comprise geophone measurements.

6. The method of claim 1 further comprising, in the computer, transforming the collocated measurements related to pressure and vertical component of motion in response to the imparted seismic energy into the frequency-wavenumber domain, and transforming the determined impulse response to the time-space domain.

7. The method of claim 1 further comprising filtering the determined impulse response of the Earth by a filter representing a band-limited monopole seismic energy source.

8. The method of claim 1 wherein the seismic energy is imparted by a source proximate the surface of a body of water.

9. The method of claim 1 wherein the measurements related to pressure and vertical component of motion in response to the imparted seismic energy are made by sensors disposed proximate the bottom of a body of water.

10. The method of claim 1 wherein the down-going component of the measurements is determined by linear decomposition.

11. A method for seismic surveying, comprising:
actuating a seismic energy source to impart seismic energy into subsurface formations;
making collocated measurements related to pressure and vertical component of motion in response to the imparted seismic energy;
entering as input to a computer the measurements related to pressure or time derivative of pressure, and vertical component of motion;
in the computer, determining a down-going component of the measurements without using an up-going component of the measurements;
in the computer, determining an impulse response of the Earth to the imparted seismic energy in the absence of a free surface from the down-going component; and
at least one of storing and displaying the determined impulse response.

12. The method of claim 11 wherein the measurements related to pressure comprise measurements of a time derivative of the pressure.

13. The method of claim 12 wherein the measurements of the time derivative comprise hydrophone measurements.

14. The method of claim 11 wherein the measurements related to vertical component of motion comprise particle velocity measurements.

15. The method of claim 14 wherein the particle velocity measurements comprise geophone measurements.

16. The method of claim 11 further comprising, in the computer, transforming the collocated measurements related to pressure and vertical component of motion in response to the imparted seismic energy to the frequency-wavenumber domain, and transforming the determined impulse response to the time-space domain.

17. The method of claim 11 further comprising filtering the determined impulse response of the Earth by a filter representing a band-limited monopole seismic energy source.

18. The method of claim 11 wherein the seismic energy is imparted by a source proximate the surface of a body of water.

19. The method of claim 11 wherein the measurements related to pressure and vertical component of motion in response to the imparted seismic energy are made by sensors disposed proximate the bottom of a body of water.

20. The method of claim 11 wherein the down-going component of the measurements is determined by linear decomposition.

21. A computer program stored in a non-transitory computer readable medium, the program having logic operable to cause a programmable computer to perform acts comprising:
accepting as input to the computer collocated measurements related to pressure and vertical component of motion resulting from seismic energy imparted into the Earth's subsurface;
determining a down-going component of the measurements without using an up-going component of the measurements;
determining an impulse response of the Earth to the imparted seismic energy in the absence of a free surface from the down-going component; and
at least one of storing and displaying the determined impulse response.

22. The computer program of claim 21 wherein the measurements related to pressure comprise measurements of a time derivative of the pressure.

23. The computer program of claim 22 wherein the measurements of a time derivative comprise hydrophone measurements.

24. The computer program of claim 21 wherein the measurements related to vertical component of motion comprise particle velocity measurements.

25. The computer program of claim 24 wherein the particle velocity measurements comprise geophone measurements.

26. The computer program of claim 21 further comprising logic operable to cause the computer to perform transforming the collocated measurements related to pressure and vertical component of motion in response to the imparted seismic energy to the frequency-wavenumber domain, and transforming the determined impulse response to the time-space domain.

27. The computer program of claim 21 further comprising logic operable to cause the computer to perform filtering the determined impulse response of the Earth by a filter representing a band-limited monopole seismic energy source.

28. The computer program of claim 21 wherein the seismic energy is imparted by a source proximate the surface of a body of water.

29. The computer program of claim 21 wherein the measurements related to pressure and vertical component of motion in response to the imparted seismic energy are made by sensors disposed proximate the bottom of a body of water.

30. The computer program of claim 21 wherein the down-going component of the measurements is determined by linear decomposition.

* * * * *